US010801726B2

(12) United States Patent
Stevens et al.

(10) Patent No.: US 10,801,726 B2
(45) Date of Patent: Oct. 13, 2020

(54) COMBUSTOR MIXER PURGE COOLING STRUCTURE

(71) Applicant: General Electric Company, Schenectady, NY (US)

(72) Inventors: Eric John Stevens, Mason, OH (US); Allen Michael Danis, Mason, OH (US); Ravi Chandra, Bangalore (IN); Jayanth Sekar, Bangalore (IN); Perumallu Vukanti, Bangalore (IN)

(73) Assignee: General Electric Company, Schenectady, NY (US)

( * ) Notice: Subject to any disclaimer, the term of this patent is extended or adjusted under 35 U.S.C. 154(b) by 288 days.

(21) Appl. No.: 15/710,921

(22) Filed: Sep. 21, 2017

(65) Prior Publication Data

US 2019/0086088 A1 Mar. 21, 2019

(51) Int. Cl.
*F23R 3/28* (2006.01)
*F23R 3/14* (2006.01)
*F23D 11/38* (2006.01)
*F23D 11/00* (2006.01)
*F23R 3/50* (2006.01)
*F23R 3/04* (2006.01)

(52) U.S. Cl.
CPC .............. *F23R 3/14* (2013.01); *F23D 11/00* (2013.01); *F23D 11/383* (2013.01); *F23R 3/04* (2013.01); *F23R 3/283* (2013.01); *F23R 3/286* (2013.01); *F23R 3/50* (2013.01); *F23R 2900/03041* (2013.01); *F23R 2900/03042* (2013.01)

(58) Field of Classification Search
CPC combination set(s) only.
See application file for complete search history.

(56) References Cited

U.S. PATENT DOCUMENTS

| 3,831,854 A | 8/1974 | Sato et al. |
| 3,946,552 A | 3/1976 | Weinstein et al. |

(Continued)

*Primary Examiner* — Gerald L Sung
*Assistant Examiner* — Marc J Amar
(74) *Attorney, Agent, or Firm* — Dority & Manning, P.A.

(57) ABSTRACT

The present disclosure is directed to a combustor assembly for a gas turbine engine. The combustor assembly includes a deflector wall, an annular axial wall, and an annular shroud. The deflector wall is extended at least partially along a radial direction and a circumferential direction relative to an axial centerline and adjacent to a combustion chamber. A fuel nozzle opening is defined through the deflector wall, and a nozzle centerline is extended through the fuel nozzle opening along a lengthwise direction. The annular axial wall is coupled to the deflector wall and extended through the fuel nozzle opening. The axial wall is defined around the nozzle centerline. The annular shroud is defined around the nozzle centerline and extended co-directional to the axial wall. The axial wall and the annular shroud are each coupled to a radial wall defined upstream of the deflector wall. The annular shroud, the axial wall, and the radial wall together define a cooling plenum therebetween. The axial wall defines a discrete inlet opening therethrough providing fluid communication from a diffuser cavity to the cooling plenum. The cooling plenum defines an exit opening providing fluid communication from the cooling plenum to the combustion chamber.

20 Claims, 8 Drawing Sheets

(56) References Cited

U.S. PATENT DOCUMENTS

| | | | | |
|---|---|---|---|---|
| 4,180,974 A | * | 1/1980 | Stenger | F23R 3/14 60/748 |
| 4,198,815 A | * | 4/1980 | Bobo | F23R 3/14 239/403 |
| 4,364,522 A | | 12/1982 | Reider | |
| 4,365,470 A | * | 12/1982 | Matthews | F23R 3/283 60/740 |
| 5,437,159 A | | 8/1995 | Ansart et al. | |
| 5,592,819 A | | 1/1997 | Ansart et al. | |
| 5,623,827 A | * | 4/1997 | Monty | F23R 3/10 60/747 |
| 5,941,075 A | | 8/1999 | Ansart et al. | |
| 6,442,940 B1 | * | 9/2002 | Young | F23R 3/14 29/890.01 |
| 6,530,227 B1 | * | 3/2003 | Young | F23D 14/78 60/748 |
| 6,546,732 B1 | * | 4/2003 | Young | F23D 14/78 60/740 |
| 6,581,386 B2 | * | 6/2003 | Young | B23P 6/00 29/890.01 |
| 6,834,505 B2 | * | 12/2004 | Al-Roub | F23R 3/14 60/737 |
| 6,932,093 B2 | * | 8/2005 | Ogden | F23D 11/386 134/169 A |
| 6,959,551 B2 | | 11/2005 | Baudoin et al. | |
| 6,983,599 B2 | * | 1/2006 | Young | C23C 4/00 60/722 |
| 7,246,494 B2 | * | 7/2007 | Currin | F23R 3/14 60/748 |
| 7,654,091 B2 | * | 2/2010 | Al-Roub | F23R 3/283 60/748 |
| 7,707,832 B2 | * | 5/2010 | Commaret | F23R 3/14 60/737 |
| 7,891,190 B2 | | 2/2011 | Commaret et al. | |
| 8,127,546 B2 | * | 3/2012 | Park | F23R 3/28 181/213 |
| 9,097,425 B2 | * | 8/2015 | Hernandez | F23R 3/14 |
| 9,360,218 B2 | | 6/2016 | Rullaud et al. | |
| 9,951,955 B2 | * | 4/2018 | Sandelis | F23R 3/14 |
| 2003/0061815 A1 | * | 4/2003 | Young | B23P 6/00 60/748 |
| 2004/0065090 A1 | * | 4/2004 | Al-Roub | F23R 3/14 60/776 |
| 2004/0163678 A1 | * | 8/2004 | Ogden | F23D 11/386 134/22.18 |
| 2005/0178126 A1 | * | 8/2005 | Young | C23C 4/00 60/747 |
| 2006/0064983 A1 | * | 3/2006 | Currin | F23R 3/14 60/748 |
| 2007/0119052 A1 | * | 5/2007 | Caldwell | B23P 6/005 29/888.011 |
| 2008/0053102 A1 | * | 3/2008 | Al-Roub | F23R 3/283 60/782 |
| 2008/0295519 A1 | * | 12/2008 | Park | F23R 3/28 60/740 |
| 2010/0242484 A1 | * | 9/2010 | Suleiman | F23R 3/04 60/748 |
| 2013/0036739 A1 | * | 2/2013 | Horikawa | F23R 3/14 60/735 |

* cited by examiner

COMBUSTOR MIXER PURGE COOLING STRUCTURE

FIELD

The present subject matter relates generally to gas turbine engine combustion assemblies. More particularly, the present subject matter relates to a cooling structure for a combustor dome assembly.

BACKGROUND

Aircraft and industrial gas turbine engines include a combustor in which fuel is burned to input heat to the engine cycle. Typical combustors incorporate one or more fuel nozzles disposed through a swirler/mixer and a dome assembly separating a hot side combustion chamber and a cold side diffuser cavity. The fuel nozzles introduce fuel into an air flow stream conditioned by the mixer so that it can atomize and burn.

The combustor assembly including a swirler/mixer, a dome assembly, and features thereof, such as walls protruded into the combustion chamber, generally experience stresses induced by high combustion temperatures, thermal gradients between the combustion chamber and the diffuser cavity, and inefficient cooling due to debris and clogging of cooling passages.

Known structures for mitigating combustor assembly deterioration generally include passages that result in high air flow purges into the combustion chamber, resulting in flow separation from the structures to be cooled or the creation of recirculation zones that ingest hot gases into the cooling structures. Still further, known solutions generally enable asymmetric pressure drops between a cooling inlet and a cooling exit, resulting in asymmetric cooling flow and structural cooling generally, decreased attenuation of thermal gradients and stresses, or potential exasperation of thermal gradients due to asymmetric cooling.

Thus, there is a need for a combustor assembly including a cooling structure that decreases variation in cooling flow and structural cooling, reduces the thermal gradient and thermal stresses, and mitigates damage or deterioration due to debris or clogging of cooling passages.

BRIEF DESCRIPTION

Aspects and advantages of the invention will be set forth in part in the following description, or may be obvious from the description, or may be learned through practice of the invention.

The present disclosure is directed to a combustor assembly and a gas turbine engine including the combustor assembly. The combustor assembly includes a deflector wall, an annular axial wall, and an annular shroud. The deflector wall is extended at least partially along a radial direction and a circumferential direction relative to an axial centerline and adjacent to a combustion chamber. A fuel nozzle opening is defined through the deflector wall, and a nozzle centerline is extended through the fuel nozzle opening along a lengthwise direction. The annular axial wall is coupled to the deflector wall and extended through the fuel nozzle opening. The axial wall is defined around the nozzle centerline. The annular shroud is defined around the nozzle centerline and extended co-directional to the axial wall. The axial wall and the annular shroud are each coupled to a radial wall defined upstream of the deflector wall. The annular shroud, the axial wall, and the radial wall together define a cooling plenum therebetween. The axial wall defines a discrete inlet opening therethrough providing fluid communication from a diffuser cavity to the cooling plenum. The cooling plenum defines an exit opening providing fluid communication from the cooling plenum to the combustion chamber.

In one embodiment, the axial wall defines a plurality of discrete inlet openings defined therethrough. Each inlet opening is defined in adjacent circumferential arrangement around the nozzle centerline.

In another embodiment, the cooling plenum is defined annular around the nozzle centerline.

In various embodiments, the combustor assembly further includes a plenum wall defining a plenum passage extended at least along the lengthwise direction providing fluid communication from the cooling plenum to the exit opening. In one embodiment, the plenum wall defines a cylindrical or conical wall defining a discrete cylindrical or conical plenum passage. In another embodiment, the combustor assembly defines a plurality of the plenum wall disposed in adjacent circumferential arrangement around the nozzle centerline, wherein each plenum wall defines a discrete plenum passage.

In yet another embodiment, the plenum passage is further defined at least partially along a circumferential direction relative to the nozzle centerline. An upstream opening adjacent to the cooling plenum is at a first circumferential position and a downstream opening adjacent to the exit opening is at a second circumferential position different from the first circumferential position. In still yet another embodiment, the plenum passage is further defined at least partially along a radial direction relative to the nozzle centerline. An upstream opening adjacent to the cooling plenum is at a first radial position and a downstream opening adjacent to the exit opening is at a second radial position different from the first radial position.

In still various embodiments, an exit passage is defined between the deflector wall and the annular shroud between the exit opening and a downstream opening of the plenum passage, wherein the annular shroud and the deflector wall are at least approximately parallel along the exit passage. In one embodiment, the deflector wall and the annular shroud extend at an acute angle relative to the nozzle centerline, the deflector wall and annular shroud defining the exit passage at an acute angle relative to the nozzle centerline.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. Furthermore, an upstream end 99 is generally provided to denote the direction from which the fluid flows. A downstream end 98 is generally provided to denote the direction to which the fluid flows. As such, references to "upstream of" or "downstream of" refer to a direction from a referenced object, point, or plane toward the upstream end 99 or downstream end 98, respectively.

Embodiments of a combustor assembly including a cooling structure are generally provided that decrease variation in cooling flow and structural cooling, reduce the thermal gradients and thermal stresses, and mitigate damage or deterioration due to debris or clogging of cooling passages. The combustor assembly includes a deflector wall defining a fuel nozzle opening, a swirler/mixer lip or eyelet, and a cooling plenum extended therethrough providing a generally low velocity flow of cooling air. The generally low velocity flow of air from the diffuser cavity to the combustion chamber provides attenuation of thermal stresses and reduces the thermal gradient while mitigating recirculation and ingestion of combustion gases into the cooling plenum. A plurality of discrete inlet openings to the cooling plenum and discrete exit openings to the combustion chamber improves control of the pressure drop therebetween and reduces variation in pressure or flow of air therethrough.

Figure 1:
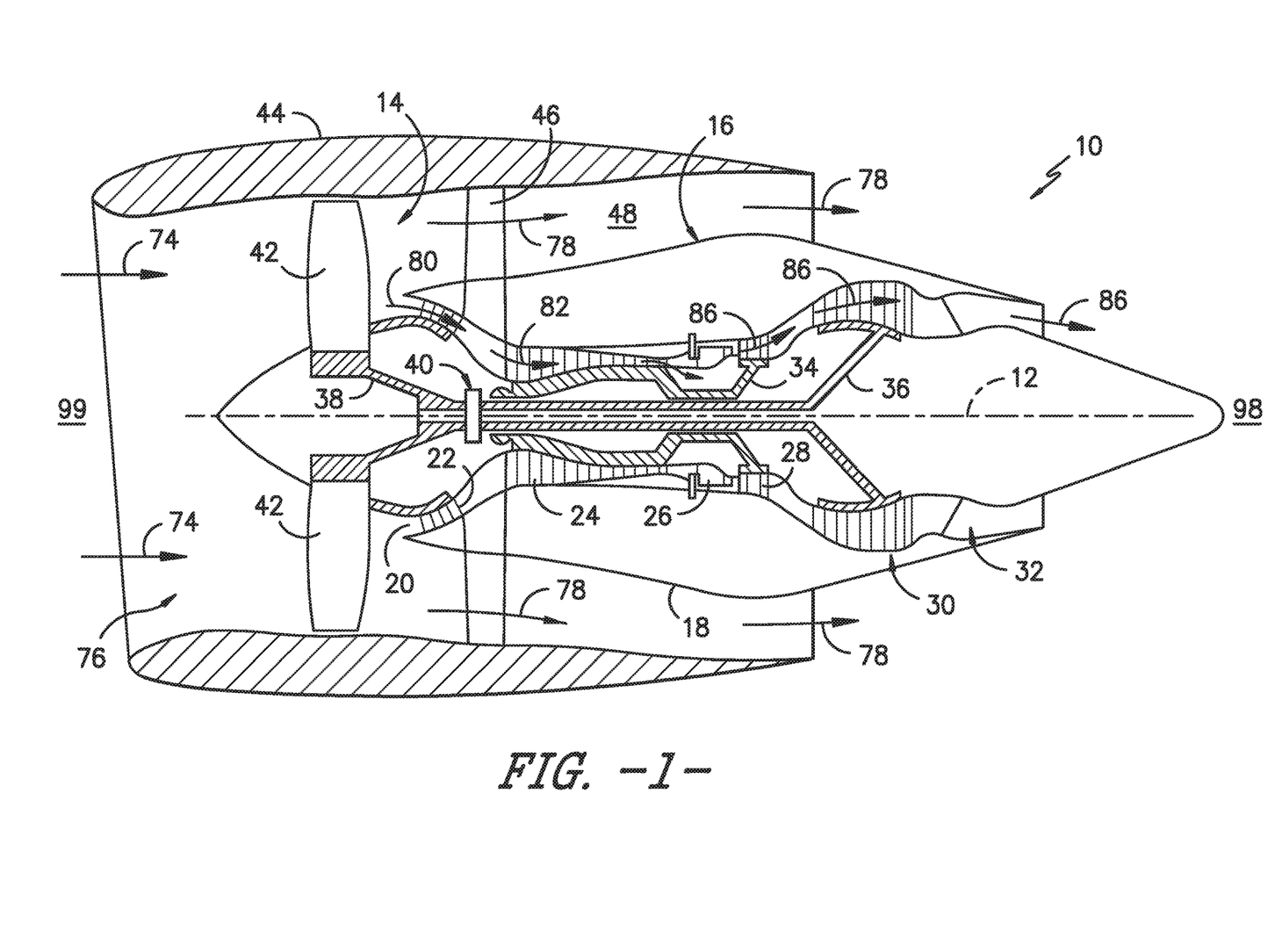
FIG. 1 is a schematic cross-sectional view of an exemplary gas turbine engine.

Referring now to the drawings, FIG. 1 is a schematic partially cross-sectioned side view of an exemplary gas turbine engine 10 herein referred to as "engine 10" as may incorporate various embodiments of the present invention. Although further described herein as a turbofan engine, the engine 10 may define a turboshaft, turboprop, or turbojet gas turbine engine, including marine and industrial engines and auxiliary power units. As shown in FIG. 1, the engine 10 has a longitudinal or axial centerline axis 12 that extends therethrough for reference purposes. In general, the engine 10 may include a fan assembly 14 and a core turbine engine or gas turbine engine 16 disposed downstream from the fan assembly 14.

The gas turbine engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the gas turbine engine 16. It should be appreciated by those of ordinary skill in the art that the nacelle 44 may be configured to be supported relative to the gas turbine engine 16 by a plurality of circumferentially-spaced outlet guide vanes or struts 46. Moreover, at least a portion of the nacelle 44 may extend over an outer portion of the gas turbine engine 16 so as to define a bypass airflow passage 48 therebetween.

Figure 2:
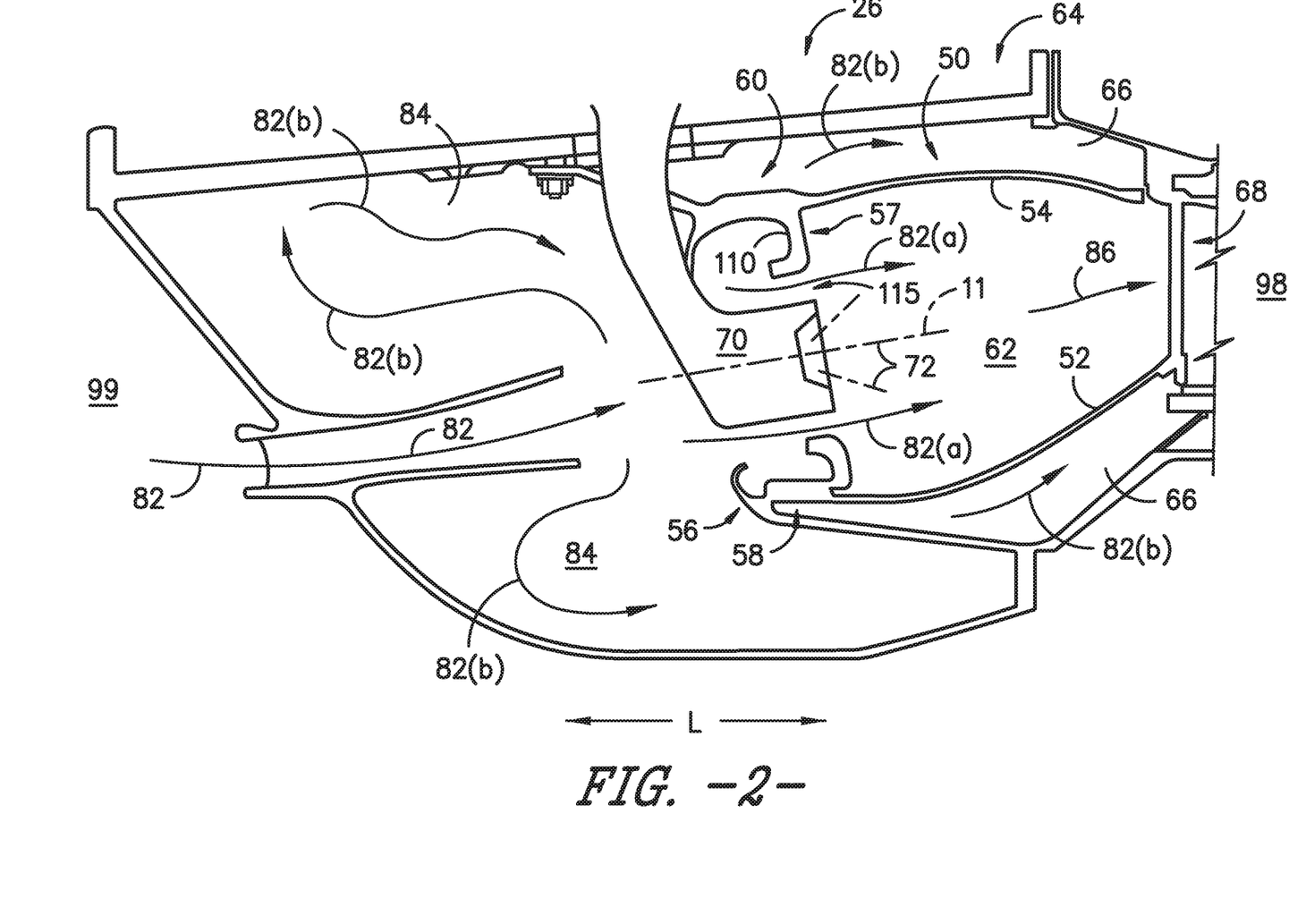
FIG. 2 is a cross sectional side view of an exemplary combustion section of the gas turbine engine as shown in FIG. 1.

FIG. 2 is a cross sectional side view of an exemplary combustion section 26 of the gas turbine engine 16 as shown in FIG. 1. As shown in FIG. 2, the combustion section 26 may generally include an annular type combustor assembly 50 having an annular inner liner 52, an annular outer liner 54, a bulkhead wall 56, and a deflector wall 110. The bulkhead wall 56 and the dome assembly 57 each extend radially between upstream ends 58, 60 of the radially spaced inner liner 52 and the outer liner 54, respectively. The dome assembly 57 is disposed downstream of the bulkhead wall 56, adjacent to a generally annular combustion chamber 62 defined between the dome assembly 57, the inner liner 52, and the outer liner 54. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within a diffuser or outer casing 64. An outer flow passage 66 may be defined around the inner liner 52 and/or the outer liner 54. The inner liner 52 and the outer liner 54 may extend from the bulkhead wall 56 towards a turbine nozzle or inlet 68 to the HP turbine 28 (FIG. 1), thus at least partially defining a hot gas path between the combustor assembly 50 and the HP turbine 28.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows into a diffuser cavity or head end portion 84 of the combustion section 26.

The compressed air 82 pressurizes the diffuser cavity 84. A first portion of the of the compressed air 82, as indicated schematically by arrows 82(a) flows from the diffuser cavity 84 into the combustion chamber 62 where it is mixed with the fuel 72 and burned, thus generating combustion gases, as indicated schematically by arrows 86, within the combustor assembly 50. Typically, the LP and HP compressors 22, 24 provide more compressed air to the diffuser cavity 84 than is needed for combustion. Therefore, a second portion of the compressed air 82 as indicated schematically by arrows 82(b) may be used for various purposes other than combustion. For example, as shown in FIG. 2, compressed air 82(b) may be routed into the outer flow passage 66 to provide cooling to the inner and outer liners 52, 54. In addition or in the alternative, at least a portion of compressed air 82(b) may be routed out of the diffuser cavity 84. For example, a portion of compressed air 82(b) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the gas turbine engine 16 to provide propulsive thrust.

Figure 3:
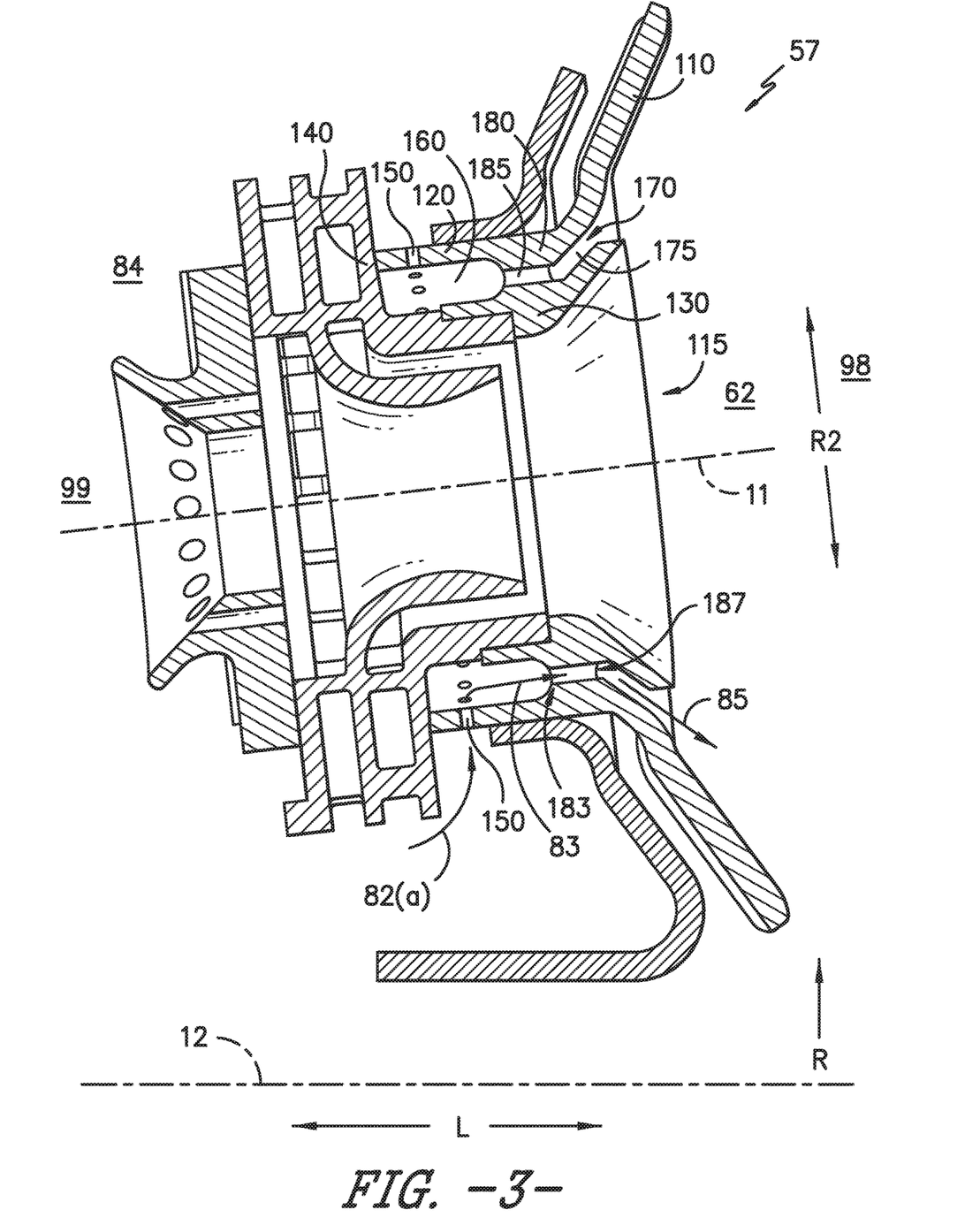
FIG. 3 is an axial cross sectional view of an exemplary embodiment of a portion of a combustion assembly generally included in the combustion section of FIG. 2.
Figure 4:
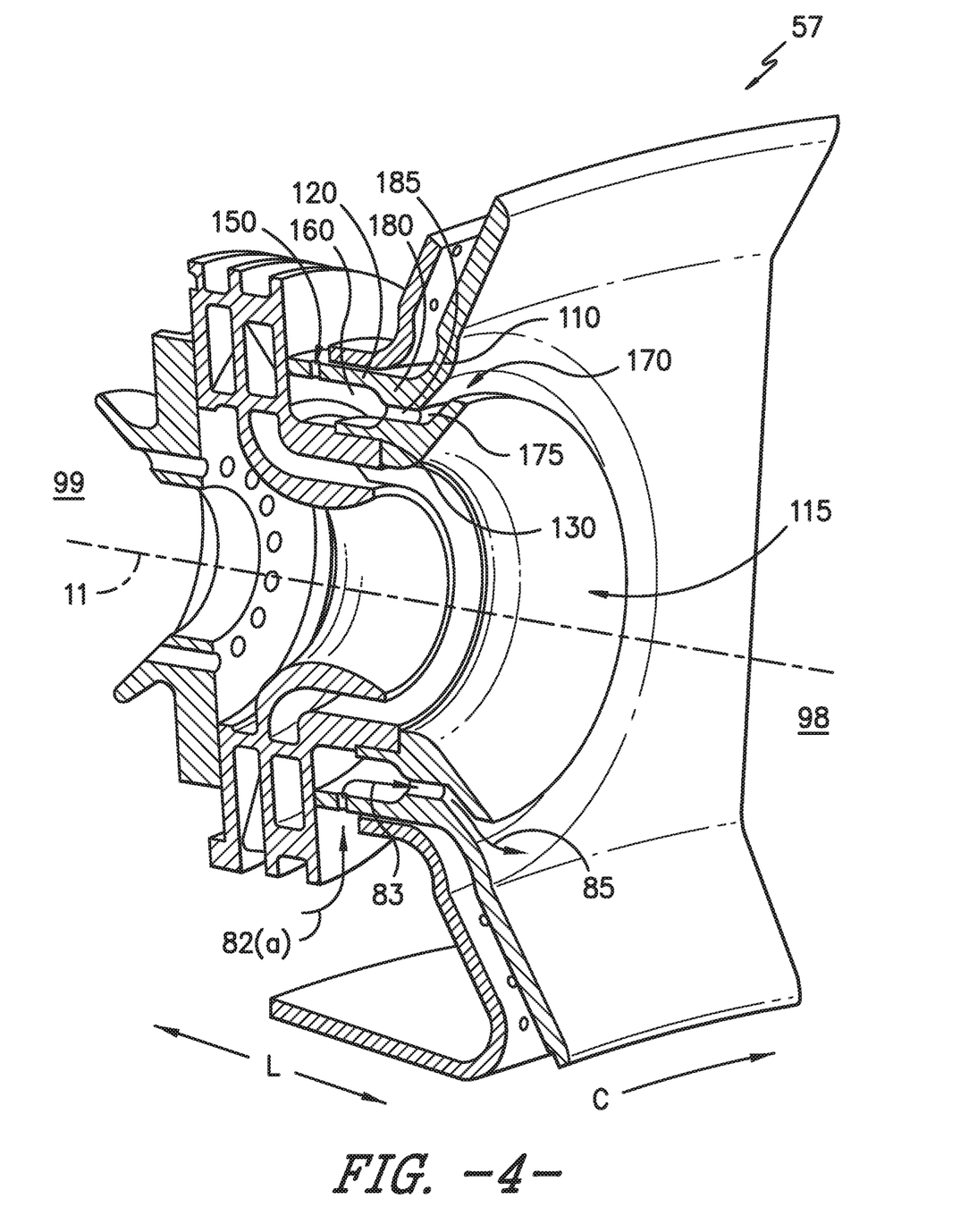
FIG. 4 is a perspective view of the portion of the combustor assembly generally provided in FIG. 3.

Referring now to FIGS. 3-4, exemplary embodiments of a portion of the combustor assembly 50 are generally provided. More specifically, a portion of the dome assembly 57 of the combustor assembly 50 is generally provided (fuel nozzle 70 removed for clarity). The dome assembly 57 includes a deflector wall 110 extended at least partially along a radial direction R and a circumferential direction C relative to the axial centerline 12 and adjacent to the combustion chamber 62. A fuel nozzle opening 115 is defined through the deflector wall 110, through which the fuel nozzle 70 (FIG. 2) at least partially extends. A nozzle centerline 11 is extended through the fuel nozzle opening 115 along a lengthwise direction L (see FIGS. 2-4).

Although the nozzle centerline 11 is generally provided, it should be appreciated that the fuel nozzle 70 may be disposed approximately concentric, or approximately eccentric, relative to the nozzle centerline 11 or the fuel nozzle opening 115. Therefore, the nozzle centerline 11 may be an approximation of a centerline through the fuel nozzle opening 115, with the fuel nozzle 70 concentric or eccentric through the fuel nozzle opening 115. A radial direction R2 is generally provided in FIG. 3 as reference extended from the nozzle centerline 11.

The dome assembly 57 further includes an annular axial wall 120 coupled to the deflector wall 110 and extended through the fuel nozzle opening 115. The axial wall 120 is defined around the nozzle centerline 11. For example, the axial wall 120 may be defined annularly around the nozzle centerline 11.

The dome assembly 57 further includes an annular shroud 130 defined around the nozzle centerline 11 and extended co-directional to the axial wall 120. The axial wall 120 and the annular shroud 130 are each coupled to a radial wall 140 defined upstream of the deflector wall 110. The axial wall 120, annular shroud 130, and the radial wall 140 together define a cooling plenum 160 therebetween. The axial wall 120 defines a discrete inlet opening 150 therethrough providing fluid communication from the diffuser cavity 84 to the cooling plenum 160. The cooling plenum 160 defines an exit opening 170 providing fluid communication from the cooling plenum 160 to the combustion chamber 62.

Referring still to FIGS. 3-4, a portion of the compressed air 82(a) enters the cooling plenum 160 through each inlet opening 150 defined through the axial wall 120. The axial wall 120 provides fluid segregation between the cooling plenum 160 and the diffuser cavity 84 except for the plurality of inlet openings 150. The compressed air 82(a) within the cooling plenum 160, shown schematically by arrows 83, flows through the cooling plenum 160 and egresses through the exit opening 170 to the combustion chamber 62.

The dome assembly 57 defines a cooling structure that decreases variation in flow of cooling air 82(a), 83, 85 and, as a result, reduces variations in structural cooling, thermal stresses, and thermal gradients at the dome assembly 57, such as at the axial wall 120, the annular shroud 130, and the deflector wall 110. The plurality of discrete inlet openings 150 through the axial wall 120 reduces variation in flow or pressure of cooling air 82(a), 83, 85 by defining the cooling plenum 160 as a cavity that may normalize circumferential variations in pressure of the air 83 before egressing through the exit opening 170 as air 85. Circumferential differences in pressure or flow around the exit openings 170 caused by clogging, plugging, or otherwise partial or full obstruction of one or more of the plurality of discrete inlet openings 150 are mitigated by the cooling plenum 160.

Furthermore, the axial wall 120 defining the plurality of inlet openings 150 generally decreases the pressure of cooling air 82(a) in the cooling plenum 160, thereby providing a relative low velocity flow of air 85 through the exit openings 170 to the combustion chamber 62. The relatively low velocity of air 85 mitigates recirculation of combustion gases 86 (shown in FIG. 2) that may otherwise backflow or ingest into the exit opening 170 and further expose the dome assembly 57 to heat, damage, and deterioration. As such, the plurality of inlet openings 150 defined through the axial wall 120 may enable a relatively low velocity of air 85 through the exit openings 170 that may mitigate structural deterioration of one or more of the axial wall 120, the annular shroud 130, and the deflector wall 110.

Referring now to the exemplary embodiments of at least a portion of the dome assembly 57 of the combustor assembly 50 generally provided in FIGS. 3-6, the axial wall 120 defines the inlet opening 150 as a plurality of discrete inlet openings 150 disposed in adjacent circumferential arrangement around the nozzle centerline 11.

In various embodiments, the cooling plenum 160 is defined annularly around the nozzle centerline 11. However, in other embodiments, the cooling plenum 160 may include one or more walls to subdivide the cooling plenum 160 into two, three, or four circumferential sections. Subdivision of the cooling plenum 160 may result from adding a wall or other feature to provide structural support to the dome assembly 57, such as from the axial wall 120 to the annular shroud 130. However, the cooling plenum 160 generally includes a maximum plurality of inlet openings 150 to mitigate flow or pressure variations around the circumference of axial wall 120 and annular shroud 130. Subdivision of the cooling plenum 160 may be used to provide more or less air 85 to various portions of the exit openings 170.

Figure 5:
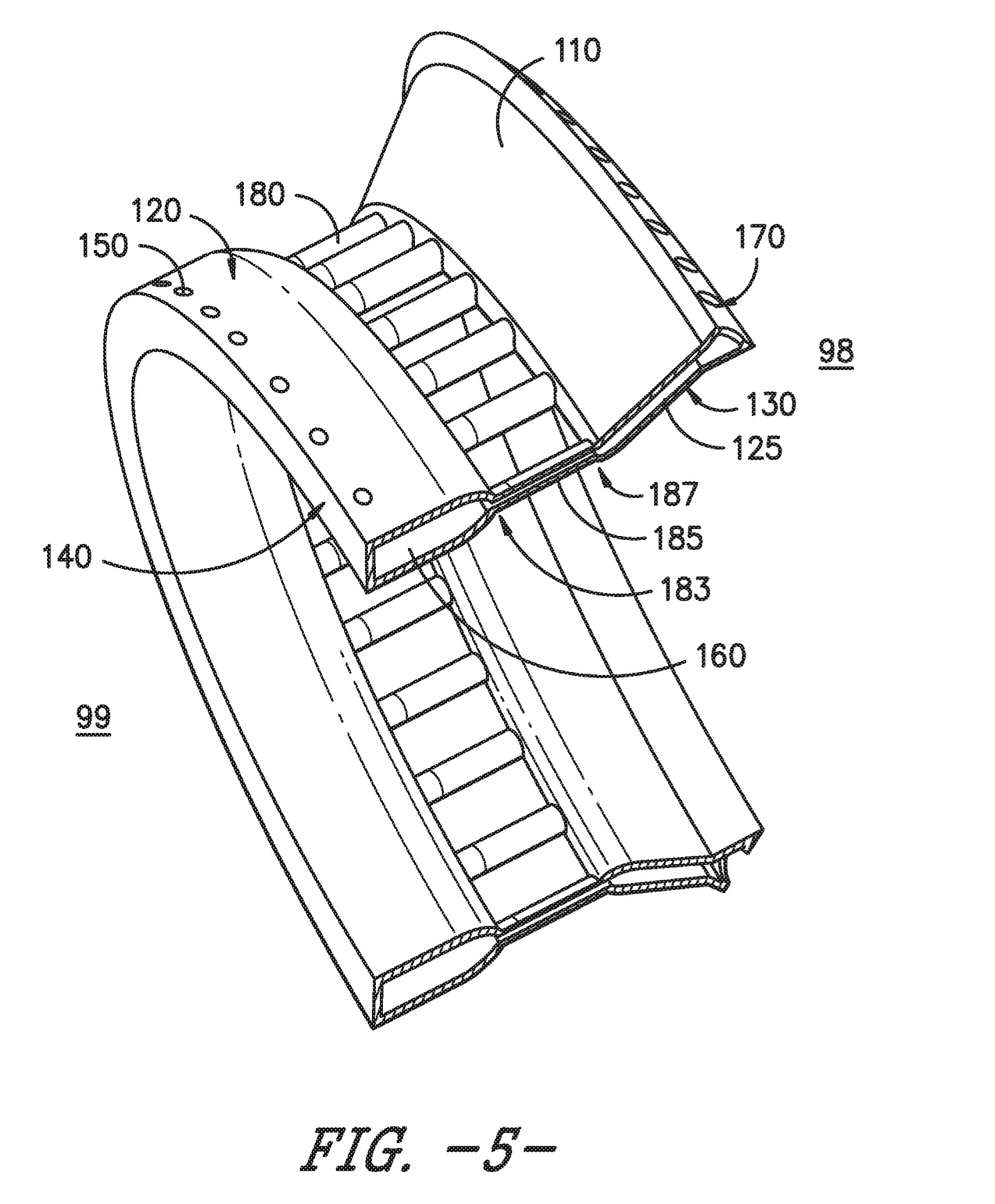
FIG. 5 is a perspective view of an exemplary embodiment of a portion of the combustor assembly.
Figure 6:
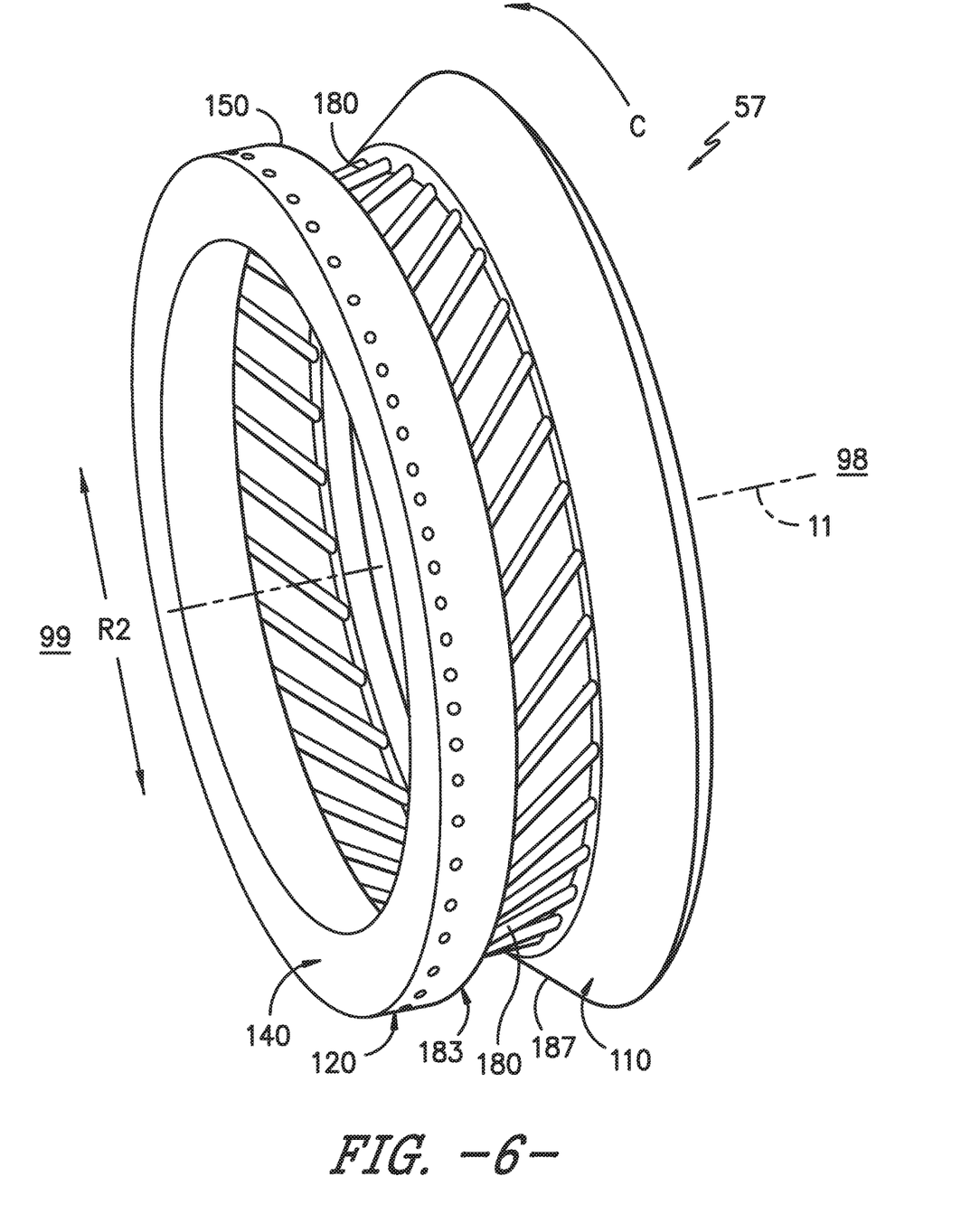
FIG. 6 is a perspective view of another exemplary embodiment of a portion of the combustor assembly.

Referring now to FIGS. 5-6, perspective views of exemplary embodiments of a portion of the dome assembly 57 of the combustor assembly 50 of FIGS. 3-4 are generally provided. The views generally provided in FIGS. 5-6 provide exemplary details of a plenum wall 180 defining a plenum passage 185 extended at least along the lengthwise direction L providing fluid communication from the cooling plenum 160 to the exit opening 170. The plenum wall 180 may generally define a cylindrical or conical wall defining a discrete cylindrical or conical plenum passage 185. As generally provided in FIGS. 5-6, the dome assembly 57 defines a plurality of the plenum wall 180 disposed in adjacent circumferential arrangement around the nozzle centerline 11. Each plenum wall 180 defines a discrete plenum passage 185.

The plenum wall 180 enables further defining the cooling plenum 160 as a cavity in which a pressure or flow of air 83 is normalized before egressing through the plenum passage 185 through to the exit opening 170 as a generally uniform and low velocity flow around the annulus of each fuel nozzle opening 115.

In various embodiments, such as generally provided in FIGS. 3-6, the plenum wall 180 defines an upstream opening 183 adjacent to the cooling plenum 160 and a downstream opening 187 adjacent to the exit opening 170. The deflector wall 110 and the annular shroud 130 together define an exit passage 175 between deflector wall 110 and the annular shroud 130. More specifically, the exit passage 175 is defined between the downstream opening 187 of the plenum passage 185, the deflector wall 110, and the annular shroud 130. In one embodiment, such as generally provided in FIGS. 3-5, the exit passage 175 is defined at least approximately parallel along the exit passage 175. In other embodiments, the exit passage 175 may define a diverging or increasing cross sectional area from the upstream end to the downstream end. In still other embodiments, the exit passage 175 may define a converging or decreasing cross sectional area from the upstream end to the downstream end. In still another embodiment, the deflector wall 110 and the annular shroud 130 together extend at an acute angle relative to the nozzle centerline 11, such as to flare outward relative to the nozzle centerline 11.

Referring now to the exemplary embodiment generally provided in FIG. 6, the plenum passage 185 is further defined at least partially along a circumferential direction relative to the nozzle centerline 11. For example, the upstream opening 183 of the plenum passage 185 adjacent to the cooling plenum 160 is at a first circumferential position and the downstream opening 187 adjacent to the exit opening 170 or exit passage 175 is at a second circumferential position different from the first circumferential position. In another embodiment, the plenum passage 185 is further defined at least partially along a radial direction R2 relative to the nozzle centerline 11. For example, the upstream opening 183 is at a first radial position and the downstream opening 187 is at a second radial position different from the first radial position.

Referring to FIGS. 5-6, although the plenum wall 180 is defined generally as cylindrical or conical members, it should be appreciated that in other embodiments the plenum wall 180 may be defined generally annularly. Still further, the plenum wall 180 may define an extended slot, such as an oval or otherwise oblong passage. The plurality of plenum passages 185 are defined extended therethrough to define generally cylindrical or conical plenum passages 185 from the cooling plenum 160 to the exit opening 170 or exit passage 175. However, in the embodiments generally provided in FIGS. 5-6, the plurality of plenum wall 180 defining generally cylindrical or conical members may enable further reduction in the thermal gradient at the dome assembly 57 and attenuation of thermal stresses by providing a generally more even thermal gradient (e.g., reduced high/low variations at the plenum wall 180) along the lengthwise direction L and the circumferential direction C.

Figure 7:
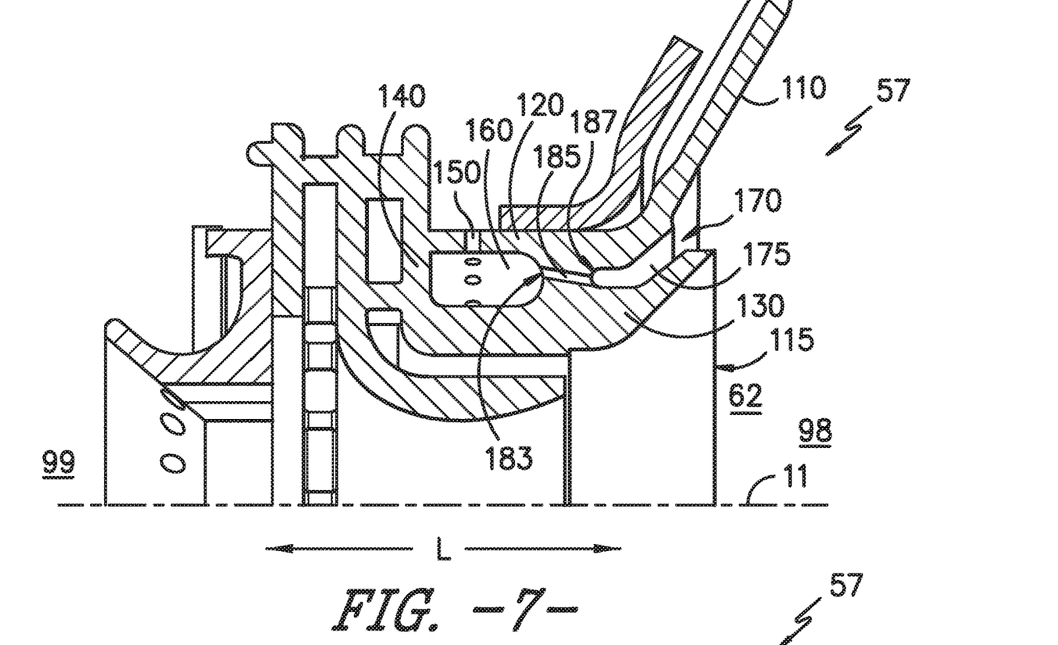
FIG. 7 is an axial cross sectional view of another exemplary embodiment of a portion of a combustor assembly generally included in the combustion section of FIG. 2.
Figure 8:
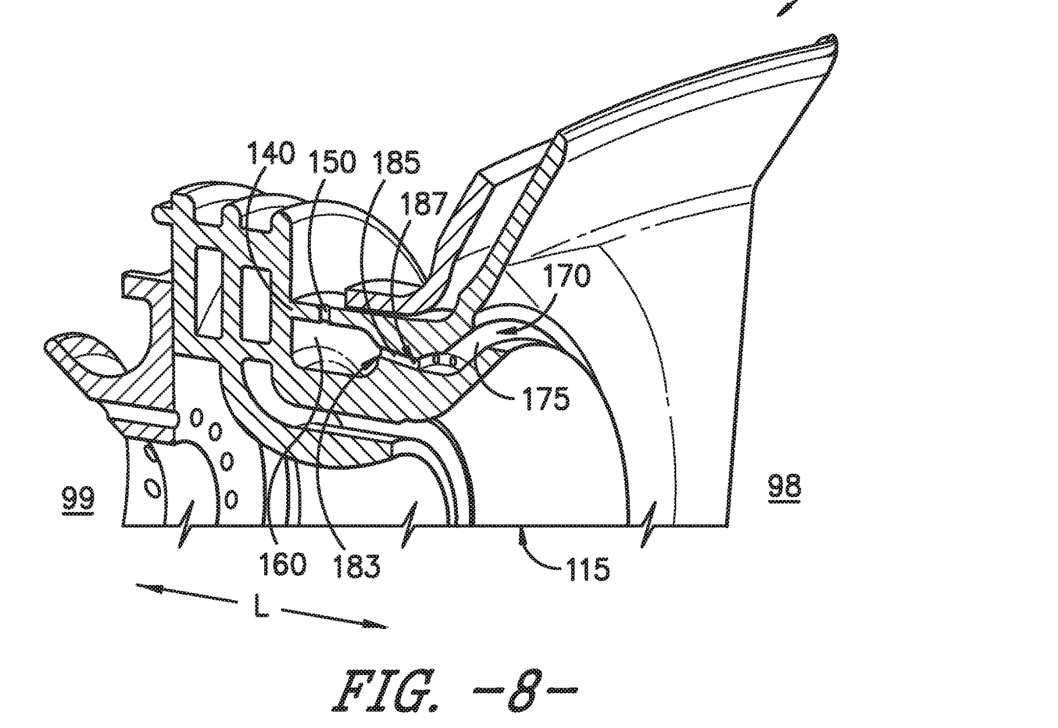
FIG. 8 is a perspective view of the portion of the combustor assembly generally provided in FIG. 7.

Referring now to FIGS. 7-8, a side view and a perspective view, respectively, are generally provided of another embodiment of a portion of the dome assembly 57 of the combustor assembly 50. The embodiments generally provided may be configured substantially similarly as described in regard to FIGS. 1-6. However, in FIGS. 7-8, the plenum passage 185 is extended at an angle along the radial direction relative to the nozzle centerline 11. For example, as shown in FIGS. 7-8, the plenum passage 185 may extend generally toward the nozzle centerline 11 along the longitudinal direction L from the upstream end 99 to the downstream end 98. In other embodiments, the plenum passage 185 may extend generally outward from the nozzle centerline 11 along the longitudinal direction L toward the downstream end 98.

Referring still to FIGS. 7-8, the exit passage 175 may define one or more contours. For example, such as generally shown in FIGS. 7-8, the exit passage 175 may define an approximately longitudinal portion and a portion extended outward from the nozzle centerline 11. In various embodiments, the exit passage 175 may define other or additional contours, such as a serpentine passage.

Figure 9:
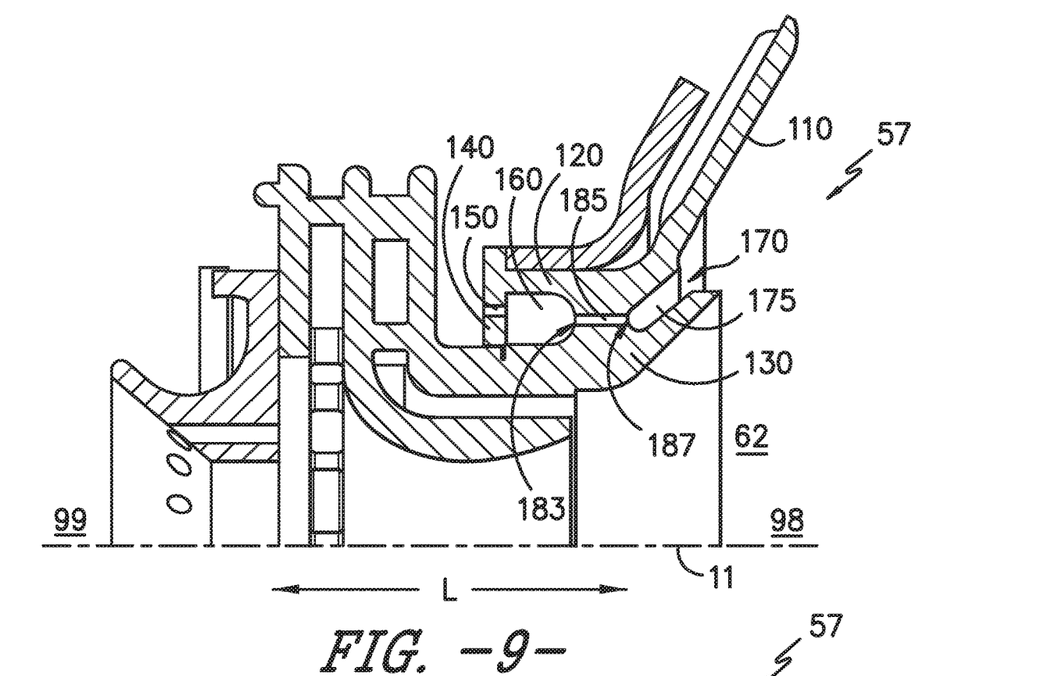
FIG. 9 is an axial cross sectional view of yet another exemplary embodiment of a portion of a combustor assembly generally included in the combustion section of FIG. 2.
Figure 10:
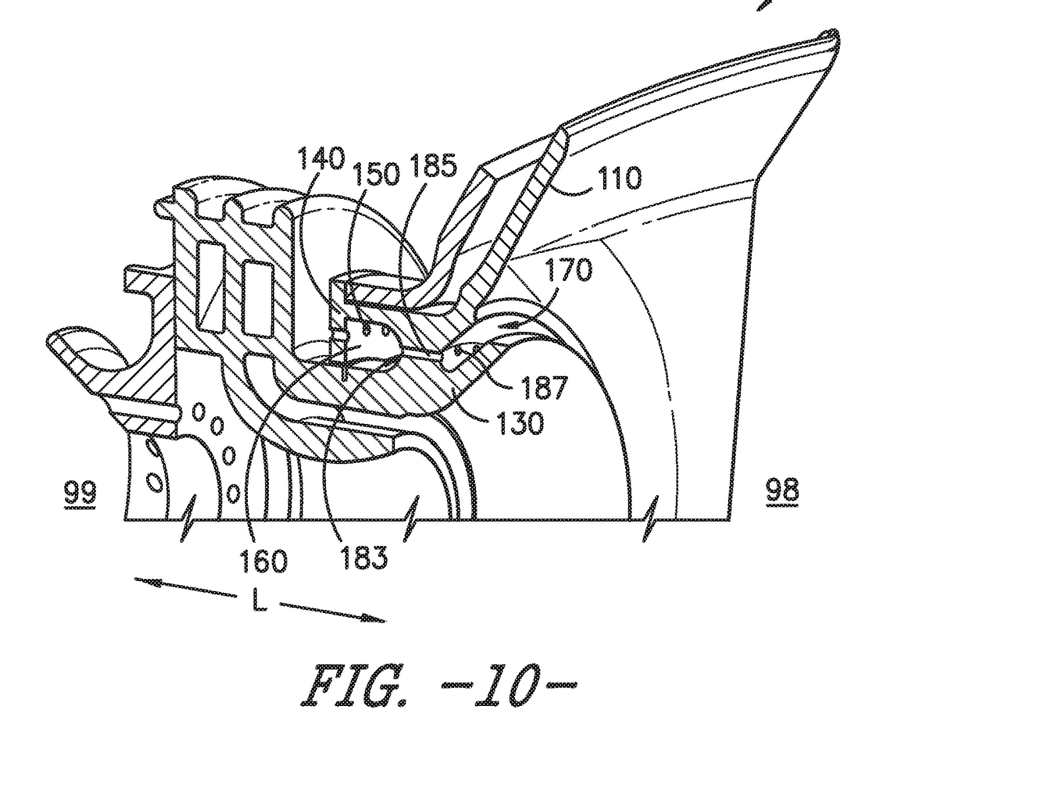
FIG. 10 is a perspective view of the portion of the combustor assembly generally provided in FIG. 9.

Referring now to FIGS. 9-10, a side view and a perspective view, respectively, are generally provided of yet another embodiment of a portion of the dome assembly 57 of the combustor assembly 50. The embodiments generally provided may be configured substantially similarly as described in regard to FIGS. 1-8. However, in FIGS. 9-10 the inlet openings 150 are defined through the radial wall 140. The radial wall 140 is extended between the axial wall 120 and the annular shroud 130. The inlet openings 150 are defined generally along the longitudinal direction L through the radial wall 150 to provide a flow of air $82(a)$ therethrough, such as described in regard to FIGS. 1-8.

Various embodiments of the combustor assembly 50 shown and described in regard to FIGS. 1-10 may define a delta pressure or pressure drop across inlet openings 150 from the diffuser cavity 84, through the cooling plenum 160, and through the plenum passages 185 and exit openings 170 to the combustion chamber 62. For example, the diffuser cavity 84 may define a first pressure value (P1), the cooling plenum 160, or more generally, the volume between the inlet opening 150 and the exit opening 170 that may further include the plenum passage 185, may define a second pressure value (P2), and the combustion chamber 62 may define a third pressure value (P3), in which the pressure drop (DP) is defined as:

$$DP = \frac{(P2 - P1)}{(P3 - P1)}$$

In various embodiments, the pressure drop (DP), as a percentage, is between approximately 50% to approximately 90% at various steady-state and transient engine operating conditions. For example, engine operating conditions may range from a startup/ignition and low power condition (e.g., sub-idle, idle) to mid-power and high-power conditions (e.g., cruise, climb, takeoff, each relative to a landing-takeoff cycle, or equivalents thereof). It should be appreciated that although exemplary engine operating conditions may be denoted in reference to a landing-takeoff cycle, engine operating conditions may be denoted in respective part-load or part-power conditions for other apparatuses, including, but not limited to, turboshaft/turboprop applications, including marine and industrial gas turbine engines and auxiliary power units.

The various embodiments of the dome assembly 57 including the deflector wall 110, the axial wall 120, and the annular shroud 130 may together define a heat shield and swirler/mixer assembly for the combustor assembly 50 for the gas turbine engine 10. The plurality of inlet openings 150 generally direct the flow of air 82(a) into the cooling plenum 160 defined around the axial wall 120 and annular shroud 130 (e.g., defining a swirler or mixer assembly for a fuel nozzle). The plurality of discrete inlet openings 150 defined in circumferential arrangement enables continuous feed and purge of air 82(a) through the cooling plenum 160 and egress as air 85 to the combustion chamber 62. The inlet openings 150 are generally defined to remove a majority of pressure drop in the cooling structure defined through the dome assembly 57, thereby reducing recirculation of hot combustion gases 86 into the exit opening 170 or exit passage 175 and further reducing thermal stresses at the annular shroud and deflector wall 130 (e.g., defining an eyelet of the dome assembly 57 of the combustor assembly 50).

Still further, the generally low velocity of the flow of air 85 enables a generally circumferentially uniform flow through the exit passage 175 and exit opening 170, reducing flow separation and further reducing thermal stresses at the dome assembly 57. In still various embodiments, the plurality of inlet openings 150 may generally define a larger cross sectional area or volume than the plurality of exit openings 170, the plurality of plenum passages 185, or both.

It should be appreciated that the various embodiments of the combustor 50 and dome assembly 57 generally provided herein may include combinations of features described across the embodiments shown and described in regard to FIGS. 1-10. For example, all or part of the dome assembly 57 may include one or more straight longitudinal, radially angled, or tangentially angled plenum passages 185 or one or more straight or contoured exit passages 175. The tangentially angled plenum passage 185 may further induce a swirl of the air 85 exiting therethrough to the combustion chamber 62. Still further, embodiments of the dome assembly 57 may be varied within the combustor assembly 50, such as to provide one or more of the embodiments shown and described herein at one or more fuel nozzles 70 of the combustor assembly 50. Furthermore, various embodiments of the combustion section 26 including the combustor assembly 50 and dome assembly 57 described herein may be configured as a rich-burn combustor assembly.

All or part of the combustor assembly 50 and the dome assembly 57 may be part of a single, unitary component and may be manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or any combination thereof may be utilized to construct the combustor assembly. Furthermore, the combustor assembly may constitute one or more individual components that are mechanically joined (e.g. by use of bolts, nuts, rivets, or screws, or welding or brazing processes, or combinations thereof) or are positioned in space to achieve a substantially similar geometric, aerodynamic, or thermodynamic results as if manufactured or assembled as one or more components. Non-limiting examples of suitable materials include nickel and cobalt-based alloys.

The foregoing has described a combustor assembly for a gas turbine engine. All of the features disclosed in this specification (including any accompanying claims, abstract and drawings), and/or all of the steps of any method or process so disclosed, may be combined in any combination, except combinations where at least some of such features and/or steps are mutually exclusive.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine, the combustor assembly comprising:

a deflector wall extended at least partially along a radial direction and a circumferential direction relative to an axial centerline and adjacent to a combustion chamber, wherein a fuel nozzle opening is defined through the deflector wall, and wherein a nozzle centerline is extended through the fuel nozzle opening along a lengthwise direction;

an annular axial wall coupled to the deflector wall and extended through the fuel nozzle opening, the axial wall defined around the nozzle centerline; and an annular shroud defined around the nozzle centerline and extended co-directional to the axial wall, wherein the axial wall and the annular shroud are each coupled to a radial wall defined upstream of the deflector wall, wherein the annular shroud, the axial wall, and the radial wall together define a cooling plenum therebetween, wherein the axial wall defines a discrete inlet opening through the axial wall at a location that is an axial distance away from the radial wall providing fluid communication from a diffuser cavity to the cooling plenum, and wherein the cooling plenum defines an exit opening providing fluid communication from the cooling plenum to the combustion chamber, wherein the combustor assembly further comprises a plenum wall defining a plenum passage extended at least along the lengthwise direction providing fluid communication from the cooling plenum to the exit opening, wherein the plenum wall is cylindrical or conical, and wherein the plenum passage is a discrete cylindrical or conical plenum passage.

2. The combustor assembly of claim 1, wherein the axial wall defines a plurality of discrete inlet openings defined therethrough, each inlet opening defined in adjacent circumferential arrangement around the nozzle centerline.

3. The combustor assembly of claim 1, wherein the cooling plenum is defined annular around the nozzle centerline.

4. A combustor assembly for a gas turbine engine, the combustor assembly comprising:
   a deflector wall extended at least partially along a radial direction and a circumferential direction relative to an axial centerline and adjacent to a combustion chamber, wherein a fuel nozzle opening is defined through the deflector wall, and wherein a nozzle centerline is extended through the fuel nozzle opening along a lengthwise direction;
   an annular axial wall coupled to the deflector wall and extended through the fuel nozzle opening, the axial wall defined around the nozzle centerline; and
   an annular shroud defined around the nozzle centerline and extended co-directional to the axial wall,
   wherein the axial wall and the annular shroud are each coupled to a radial wall defined upstream of the deflector wall,
   wherein the annular shroud, the axial wall, and the radial wall together define a cooling plenum therebetween,
   wherein the axial wall defines a discrete inlet opening through the axial wall at a location that is an axial distance away from the radial wall providing fluid communication from a diffuser cavity to the cooling plenum,
   wherein the cooling plenum defines an exit opening providing fluid communication from the cooling plenum to the combustion chamber,
   wherein the combustor assembly further a plurality of cylindrical or conical plenum walls disposed in adjacent circumferential arrangement around the nozzle centerline, and
   wherein each of the plurality of plenum walls defines a discrete cylindrical or conical plenum passage.

5. The combustor assembly of claim 4, further comprising a plenum wall defining a plenum passage extended at least along the lengthwise direction providing fluid communication from the cooling plenum to the exit opening.

6. The combustor assembly of claim 5, wherein the plenum passage is further defined at least partially along a radial direction relative to the nozzle centerline, wherein an upstream opening adjacent to the cooling plenum is at a first radial position and a downstream opening adjacent to the exit opening is at a second radial position different from the first radial position.

7. The combustor assembly of claim 5,
   wherein an exit passage is defined between the deflector wall and the annular shroud between the exit opening and a downstream opening of the plenum passage, and
   wherein the annular shroud and the deflector wall are parallel along the exit passage.

8. The combustor assembly of claim 7, wherein the deflector wall and the annular shroud extend at an acute angle relative to the nozzle centerline, the deflector wall and annular shroud defining the exit passage at an acute angle relative to the nozzle centerline.

9. A combustor assembly for a gas turbine engine, the combustor assembly comprising:
   a deflector wall extended at least partially along a radial direction and a circumferential direction relative to an axial centerline and adjacent to a combustion chamber, wherein a fuel nozzle opening is defined through the deflector wall, and wherein a nozzle centerline is extended through the fuel nozzle opening along a lengthwise direction;
   an annular axial wall coupled to the deflector wall and extended through the fuel nozzle opening, the axial wall defined around the nozzle centerline; and
   an annular shroud defined around the nozzle centerline and extended co-directional to the axial wall,
   wherein the axial wall and the annular shroud are each coupled to a radial wall defined upstream of the deflector wall,
   wherein the annular shroud, the axial wall, and the radial wall together define a cooling plenum therebetween,
   wherein the axial wall defines a discrete inlet opening through the axial wall at a location that is an axial distance away from the radial wall providing fluid communication from a diffuser cavity to the cooling plenum, and
   wherein the cooling plenum defines an exit opening providing fluid communication from the cooling plenum to the combustion chamber,
   wherein the combustor assembly further comprises a plenum wall defining a plenum passage extended at least along the lengthwise direction providing fluid communication from the cooling plenum to the exit opening,
   wherein the plenum passage is further defined at least partially along a circumferential direction relative to the nozzle centerline, and
   wherein an upstream opening of the plenum passage adjacent to the cooling plenum is at a first circumferential position and a downstream opening of the plenum passage adjacent to the exit opening is at a second circumferential position different from the first circumferential position.

10. A combustor assembly for a gas turbine engine, the combustor assembly comprising:
    a deflector wall extended at least partially along a radial direction and a circumferential direction relative to an axial centerline and adjacent to a combustion chamber, wherein a fuel nozzle opening is defined through the deflector wall, and wherein a nozzle centerline is extended through the fuel nozzle opening along a lengthwise direction;
    an annular axial wall coupled to the deflector wall and extended through the fuel nozzle opening, the axial wall defined around the nozzle centerline; and
    an annular shroud defined around the nozzle centerline and extended co-directional to the axial wall,
    wherein the axial wall and the annular shroud are each coupled to a radial wall defined upstream of the deflector wall,
    wherein the annular shroud, the axial wall, and the radial wall together define a cooling plenum therebetween,
    wherein the axial wall defines a discrete inlet opening through the axial wall at a location that is an axial distance away from the radial wall providing fluid communication from a diffuser cavity to the cooling plenum, wherein the cooling plenum defines an exit opening providing fluid communication from the cooling plenum to the combustion chamber, and wherein the plenum passage is sloped such that a downstream end of the plenum passage is closer to the nozzle centerline than an upstream end of the plenum passage.

11. A gas turbine engine, comprising:
a combustor assembly comprising:
a deflector wall extended at least partially along a radial direction and a circumferential direction relative to an axial centerline and adjacent to a combustion chamber, wherein a fuel nozzle opening is defined through the deflector wall, and wherein a nozzle centerline is extended through the fuel nozzle opening along a lengthwise direction;
an annular axial wall coupled to the deflector wall and extended through the fuel nozzle opening, the axial wall defined around the nozzle centerline; and
an annular shroud defined around the nozzle centerline and extended co-directional to the axial wall,
wherein the axial wall and the annular shroud are each coupled to a radial wall defined upstream of the deflector wall,
wherein the annular shroud, the axial wall, and the radial wall together define a cooling plenum therebetween,
wherein the axial wall defines a discrete inlet opening through the axial wall at a location that is an axial distance away from the radial wall providing fluid communication from a diffuser cavity to the cooling plenum,
wherein the cooling plenum defines an exit opening providing fluid communication from the cooling plenum to the combustion chamber,
wherein the gas turbine engine further comprises a plenum wall defining a plenum passage extended at least along the lengthwise direction providing fluid communication from the cooling plenum to the exit opening,
wherein the plenum wall is cylindrical or conical, and
wherein the plenum passage is a discrete cylindrical or conical plenum passage.

12. The gas turbine engine of claim 11, wherein the axial wall defines a plurality of discrete inlet openings defined therethrough, each inlet opening defined in adjacent circumferential arrangement around the nozzle centerline.

13. The gas turbine engine of claim 11, wherein the cooling plenum is defined annular around the nozzle centerline.

14. A gas turbine engine, comprising:
a combustor assembly comprising:
a deflector wall extended at least partially along a radial direction and a circumferential direction relative to an axial centerline and adjacent to a combustion chamber, wherein a fuel nozzle opening is defined through the deflector wall, and wherein a nozzle centerline is extended through the fuel nozzle opening along a lengthwise direction;
an annular axial wall coupled to the deflector wall and extended through the fuel nozzle opening, the axial wall defined around the nozzle centerline; and
an annular shroud defined around the nozzle centerline and extended co-directional to the axial wall,
wherein the axial wall and the annular shroud are each coupled to a radial wall defined upstream of the deflector wall,
wherein the annular shroud, the axial wall, and the radial wall together define a cooling plenum therebetween,
wherein the axial wall defines a discrete inlet opening through the axial wall at a location that is an axial distance away from the radial wall providing fluid communication from a diffuser cavity to the cooling plenum,
wherein the cooling plenum defines an exit opening providing fluid communication from the cooling plenum to the combustion chamber,
wherein the gas turbine engine further comprises a plurality of cylindrical or conical plenum walls disposed in adjacent circumferential arrangement around the nozzle centerline,
wherein each of the plurality of plenum walls defines a discrete cylindrical or conical plenum passage.

15. The gas turbine engine of claim 14, further comprising a plenum wall defining a plenum passage extended at least along the lengthwise direction providing fluid communication from the cooling plenum to the exit opening.

16. The gas turbine engine of claim 15, wherein the plenum passage is further defined at least partially along a radial direction relative to the nozzle centerline, wherein an upstream opening adjacent to the cooling plenum is at a first radial position and a downstream opening adjacent to the exit opening is at a second radial position different from the first radial position.

17. The gas turbine engine of claim 15,
wherein an exit passage is defined between the deflector wall and the annular shroud between the exit opening and the downstream opening of the plenum passage, and
wherein the annular shroud and the deflector wall are parallel along the exit passage.

18. The gas turbine engine of claim 17, wherein the deflector wall and the annular shroud extend at an acute angle relative to the nozzle centerline, the deflector wall and annular shroud defining the exit passage at an acute angle relative to the nozzle centerline.

19. A gas turbine engine, comprising:
a combustor assembly comprising:
a deflector wall extended at least partially along a radial direction and a circumferential direction relative to an axial centerline and adjacent to a combustion chamber, wherein a fuel nozzle opening is defined through the deflector wall, and wherein a nozzle centerline is extended through the fuel nozzle opening along a lengthwise direction;
an annular axial wall coupled to the deflector wall and extended through the fuel nozzle opening, the axial wall defined around the nozzle centerline; and
an annular shroud defined around the nozzle centerline and extended co-directional to the axial wall,
wherein the axial wall and the annular shroud are each coupled to a radial wall defined upstream of the deflector wall,
wherein the annular shroud, the axial wall, and the radial wall together define a cooling plenum therebetween,
wherein the axial wall defines a discrete inlet opening through the axial wall at a location that is an axial distance away from the radial wall providing fluid communication from a diffuser cavity to the cooling plenum,
wherein the cooling plenum defines an exit opening providing fluid communication from the cooling plenum to the combustion chamber,
wherein the gas turbine engine further comprises a plenum wall defining a plenum passage extended at least along the lengthwise direction providing fluid communication from the cooling plenum to the exit opening, wherein the plenum passage is further defined at least partially along a circumferential direction relative to the nozzle centerline, and wherein an upstream opening of the plenum passage adjacent to the cooling plenum is at a first circumferential position and a downstream opening of the plenum passage adjacent to the exit opening is at a second circumferential position different from the first circumferential position.

20. A gas turbine engine, comprising:

a combustor assembly comprising:

a deflector wall extended at least partially along a radial direction and a circumferential direction relative to an axial centerline and adjacent to a combustion chamber, wherein a fuel nozzle opening is defined through the deflector wall, and wherein a nozzle centerline is extended through the fuel nozzle opening along a lengthwise direction;

an annular axial wall coupled to the deflector wall and extended through the fuel nozzle opening, the axial wall defined around the nozzle centerline; and an annular shroud defined around the nozzle centerline and extended co-directional to the axial wall, wherein the axial wall and the annular shroud are each coupled to a radial wall defined upstream of the deflector wall, wherein the annular shroud, the axial wall, and the radial wall together define a cooling plenum therebetween, wherein the axial wall defines a discrete inlet opening through the axial wall at a location that is an axial distance away from the radial wall providing fluid communication from a diffuser cavity to the cooling plenum, wherein the cooling plenum defines an exit opening providing fluid communication from the cooling plenum to the combustion chamber, wherein the plenum passage is sloped such that a downstream end of the plenum passage is closer to the nozzle centerline than an upstream end of the plenum passage.

* * * * *